(12) United States Patent
Bouman

(10) Patent No.: US 9,371,008 B2
(45) Date of Patent: Jun. 21, 2016

(54) SYSTEM, DEVICES AND METHOD FOR CHARGING A BATTERY OF AN ELECTRIC VEHICLE

(75) Inventor: Crijn Bouman, The Hague (NL)

(73) Assignee: ABB B.V., Rotterdam (NL)

( * ) Notice: Subject to any disclaimer, the term of this patent is extended or adjusted under 35 U.S.C. 154(b) by 556 days.

(21) Appl. No.: 13/582,938

(22) PCT Filed: Mar. 3, 2011

(86) PCT No.: PCT/NL2011/050146
§ 371 (c)(1),
(2), (4) Date: Nov. 6, 2012

(87) PCT Pub. No.: WO2011/108925
PCT Pub. Date: Sep. 9, 2011

(65) Prior Publication Data
US 2013/0049677 A1     Feb. 28, 2013

(30) Foreign Application Priority Data

Mar. 5, 2010    (NL) ...................................... 2004350

(51) Int. Cl.
*H02J 7/00* (2006.01)
*B60L 11/18* (2006.01)
(Continued)

(52) U.S. Cl.
CPC .............. *B60L 11/185* (2013.01); *B60L 1/003* (2013.01); *B60L 1/02* (2013.01); *B60L 11/184* (2013.01); *B60L 11/1816* (2013.01); *B60L 11/1842* (2013.01); *B60L 11/1844* (2013.01); *B60L 11/1846* (2013.01); *B60L 11/1861* (2013.01); *B60L 11/1868* (2013.01); *H02J 7/0055* (2013.01); *B60L 2210/12* (2013.01);
(Continued)

(58) Field of Classification Search
CPC ..... Y02T 90/14; Y02T 10/7005; Y02T 90/128; Y02T 10/7088; Y02T 90/163
USPC .......................................................... 320/106
See application file for complete search history.

(56) References Cited

U.S. PATENT DOCUMENTS 5,327,066 A     7/1994  Smith
5,584,715 A *  12/1996  Ehrenfels ....................... 439/222
(Continued)

FOREIGN PATENT DOCUMENTS

EP       1 785 310 A2     5/2007

OTHER PUBLICATIONS

International Search Report (PCT/ISA/210) issued on Jul. 10, 2012, by the Netherlands Patent Office as the International Searching Authority for International Application No. PCT/NL2011/050146.
(Continued)

*Primary Examiner* — Arun Williams
(74) *Attorney, Agent, or Firm* — Buchanan Ingersoll & Rooney PC

(57) ABSTRACT

Energy exchange station for a battery of an electric vehicle, comprising at least one power output for a vehicle, means for determining whether a vehicle coupled to the at least one power output is able to be charged with an AC voltage and/or a DC voltage, a plurality of power inputs, comprising at least one AC power input; and at least one DC power input and at least one controllable switch, for switching the at least one power output to any of the power inputs a controller for the switch, for controlling the switch at least based on the determination.

24 Claims, 16 Drawing Sheets

(51) Int. Cl.
*B60L 1/00* (2006.01)
*B60L 1/02* (2006.01)

(52) U.S. Cl.
CPC .......... *B60L2210/20* (2013.01); *B60L 2210/30* (2013.01); *B60L 2230/16* (2013.01); *B60L 2240/70* (2013.01); *Y02E 60/721* (2013.01); *Y02T 10/7005* (2013.01); *Y02T 10/7044* (2013.01); *Y02T 10/7066* (2013.01); *Y02T 10/7088* (2013.01); *Y02T 10/725* (2013.01); *Y02T 10/7233* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(56) References Cited

U.S. PATENT DOCUMENTS

| | | |
|---|---|---|
| 5,742,229 A | 4/1998 | Smith |
| 6,371,768 B1 | 4/2002 | Neblett et al. |
| 2005/0040785 A1 | 2/2005 | Barnes et al. |
| 2008/0143290 A1* | 6/2008 | Chavakula .............. 320/101 |
| 2009/0286414 A1 | 11/2009 | Ohtomo |
| 2010/0001687 A1* | 1/2010 | Watanabe .............. 320/109 |

OTHER PUBLICATIONS

Written Opinion (PCT/ISA/237) issued on Jul. 10, 2012, by the Netherlands Patent Office as the International Searching Authority for International Application No. PCT/NL2011/050146.

* cited by examiner

SYSTEM, DEVICES AND METHOD FOR CHARGING A BATTERY OF AN ELECTRIC VEHICLE

The present invention relates to a system, devices and method for charging a battery of an electric vehicle, in particular for charging a battery of an electric vehicle with either AC or DC power.

Popularity of electric vehicles increases, as fossil fuel becomes sparser, and well as a result of a desire to decrease exhaust pollution, especially in urban areas. A disadvantage however, is that charging of the vehicles is not yet possible at all locations. One reason that slows down the placement of charging stations for electric vehicles is a lack of regulation and standardization. Batteries deliver DC when they are discharged and require DC power sources with voltages that depend on the type of battery to be charged. As most grids are AC, various types of power converters are required as part of a battery charger in these cases. Herein, a risk is present that vehicles are coupled to a charging station that does not comply to the required power for the specific vehicle or battery.

In order to be able to charge a vehicle from an AC grid, the solution to provide electric vehicles with on-board chargers comprising an AC/DC converter has been proposed. However, size and weight of these converters increases as required charging power increases, or allowed charging time decreases, and for reasons of power efficiency it is undesired to carry voluminous and heavy chargers along on the vehicle.

It is a goal of the present invention to provide a system, devices and method for charging a battery of an electric vehicle that overcome at least part of the above disadvantages, and/or delivers a useful alternative to the state of the art.

The invention thereto proposes an energy exchange station for a battery of at least one electric vehicle, comprising at least one power output for a vehicle, at least one data communication port for communication with the electric vehicle for determining whether a vehicle is able to be charged with an AC voltage and/or a DC voltage, a plurality of power supplies, comprising at least one AC power supply and at least one DC power supply, and a controller, for controlling the power supplied from the AC power supply and/or DC power supply to the at least one power output.

Communication may specifically take place with a communication system inside the vehicle. Based on this communication to the vehicle the energy exchange station may get to know that the vehicle has the capability to receive AC power, DC power or both.

In a specific embodiment the AC power supply may be direct connected to the AC pins in the connector whereas the DC power supply may be directly coupled to the DC pins in the connector. To control the delivery of DC power to the vehicle the system can control the DC power supply (which may consist of a AC-DC converter) to deliver DC power in the range of zero (0 Watt delivered) until the maximum power of the power supply. To control the delivery of AC power to the vehicle the energy exchange station can utilize the communication channel to the vehicle to control or influence the power drawn by the onboard charger mounted inside the vehicle. The communication to the onboard charger inside the vehicle could be via any communication protocol such as serial data, a PWM signal, PLC (power-line-communication) or even an Ethernet type of connection The onboard charger may be controlled to draw anything between 0 (no power) and the maximum power of the onboard charger. When the onboard charger is controlled to draw no power and the DC supply to deliver some level of DC the result is charging the vehicle via DC power. When the onboard charger is controlled to draw a certain level of AC power and the DC power supply is controlled to deliver no power, the result is charging the vehicle via AC power. Any combination of AC and DC is also possible.

The energy exchange station may be equipped with one single connector for AC and DC power, or with separate connectors for AC and DC which are directly coupled to the AC power supply and DC power supply, respectively, and still utilize the same control method to switch between AC and DC power.

The invention further proposes an energy exchange station, for charging a battery of an electric vehicle, comprising at least one power output for a vehicle, at least one data communication port for communication with the electric vehicle for determining whether a vehicle is able to be charged with an AC voltage and/or a DC voltage; a plurality of power supplies, comprising at least one AC power supply and at least one DC power supply, at least one controllable switch, for switching the at least one power output to any of the power supplies and a controller for the switch, for controlling the switch at least based on the determination. It needs to be remarked here that both power supplies and power outputs may be bi-directional.

By providing data communication means for communication with the electric vehicle, more and more detailed information regarding charging possibilities of the vehicle can be retrieved than by means of detection means according to the art.

This is because exact specifications stored in a vehicles memory, which may be present in a vehicle management system for example, can be used. As an example one could imagine that apart from the ability to be charged with AC or DC one could communicate the frequency of AC power, the AC voltage level, the amount of phases utilized by the AC onboard charger or the maximum total AC power. For DC power one could imagine communicating the maximum DC current, the maximum and minimum DC voltage and the maximum DC power level which can be accepted by the vehicle or the maximum duration of applying the DC charge current in a charge session.

The energy exchange station according to the invention, which may for example be embodied as a charging station for an electric vehicle, offers the advantage that both AC and DC charging may be provided at the same location. AC power may be directly derived from the grid, while DC power may be derived from the grid by means of an electric power converter. Since this power converter stays at a charging location, it can be dimensioned for delivering high DC power, and, as a result, low charging times.

In case a vehicle to be charged does not provide a possibility to receive DC power, or when available grid power is low, for example due to momentary peak energy absorbance elsewhere in the grid or due to the presence of another vehicle to be charged at the same location, AC power may be provided to the vehicle, which then uses its on-board charger to charge its battery. As on-board chargers generally have a lower power rating, switching to AC charging lowers the grid load. When a very powerful on-board charger is detected, the system might switch to the better controllable DC power supply in order to lower the grid load.

In an embodiment, the means for determining are configured for detecting the presence of an on board battery charger of the vehicle, and the controller is configured to switch the output to an AC power input when an on-board battery charger is detected.

This way, optimal use is made from the hardware present in the vehicle, while converters at a charging station may be used for charging vehicles that lack an on board charger, or vehicles that have been decided to obtain priority for any reason.

In another embodiment, the controller is configured to switch to AC power after an interval of being switched to DC power, to firstly charge the battery fast on DC power, and to secondly continue charging the battery slower on AC power. High power DC charging can for example be applied until a so called constant voltage point in the charging curve of the battery is reached, and afterwards, charging is switched to AC, for finalizing the charging of the battery by the on-board charger of the vehicle, fed by the AC power source, and thus freeing the DC power source for charging other vehicles. This results in a further optimization of the available hardware. Especially since on board chargers usually have limited power, but still sufficient to finalize the charging from the constant voltage point on in an acceptable amount of time.

In another embodiment, the controller is configured to charge the vehicle from the AC power supply for a predetermined time. During this time the energy exchange station determines characteristics of the on-board charger, for example its power rate. From that knowledge, the decision can be made to charge at AC or DC or when it would be beneficial to change from charging using AC to DC or vice versa.

In yet another embodiment, the energy exchange station is configured to deliver AC power and DC power simultaneously. Thereto, a plurality of outputs may be present, for coupling multiple vehicles to the outputs, wherein each of the vehicles may be coupled to either AC or DC power.

It is also thinkable that AC and DC power are delivered to the same output, for charging a battery of a vehicle directly with DC power, and via an on-board battery charger with AC power indirectly. For that purpose, the vehicle may be coupled to the system by multiple connectors, or the system may be configured to deliver DC power with a superposed AC component.

In yet another embodiment the energy exchange station can provide both AC and DC power at the same time where the DC power is used to charge the battery while the AC power is used to power an onboard AC powered system such as an air conditioning, heater or other device. It is also thinkable that the DC power is used for these other devices and the AC power to charge the battery via the onboard charger.

The DC power source may comprise a power converter, for delivering a switched DC power. More in particular, the energy exchange station may comprise a number of power converters, for delivering suitable form of DC power (for example switched or with a predetermined voltage) to each port to which a vehicle is coupled. It is remarked here that DC power in the sense of the present invention does not only comprise a constant DC power but also switched forms like PWM (Pulse-Width Modulation, PDM (Pulse-Duration Modulation), and voltage and current gradients, as well as random signals (random/noise) and time-division multiplexing signals.

Controlling the switch may further be based on external parameters, such as power available at at least one of the power inputs, and/or power required from electric vehicles at further power outputs. The switch may for example be controlled based on input by a data processing device, such as a central, remote or external web server, database or control server. Such a data processing device may collect data from multiple vehicles, charge stations and/or current grid information, and/or other settings, such as priorities given to various vehicles by an operator or fleet owner. The energy exchange station may further be configured for data communication with the vehicle for retrieving information on the ways the vehicle can be charged.

The energy exchange station, may comprise a connector for connecting the vehicle to the output, the connector being configured for both AC and DC power transfer. In particular, the invention relates to exchanging multi-phase AC power via multiple power contacts of the power connector when a vehicle is charged with AC power; and exchanging DC power via at least two contacts of said power connector when charging a vehicle with DC power. The AC power supply may be two or three phase, but configurations up to six or more phase are thinkable too.

Using a single connector for both AC and DC power transfer makes the use of the energy exchange station more convenient. When exchanging energy with a vehicle, in particular when charging it, a user does not have to choose a particular connector that matches a (contra) connector of his vehicle. Moreover, a single connector enables the energy exchange station to switch between AC and DC power sources during energy transfer without requiring interaction from the user. This may be done over the same connections, or the connector may comprise multiple connections, as will be explained in the following.

The invention further relates to the use of a power connector in an energy exchange station as described above. The use according to the invention comprises using at least three power contacts for exchanging three phase AC power and a common ground, wherein at least one pair of contacts is used to feed a DC power through them. Power connectors suitable to be used are the IEC62196 standard, for example the REMA REV-3. Another suitable connector is the 63A Mennekes CEE connector.

In a further embodiment, the invention relates to using a power connector comprising at least 4 power contacts, of which two pairs of contacts are dimensioned such that a DC power can be fed through them. For delivering AC power, three of the four contacts are used, and a fourth may be used as a common ground. For DC power, one pair forms the positive connection, and another pair forms the negative connection. In particular, the invention makes use of a power connector that is suitable for transferring 126 Ampere DC current.

In a further embodiment, at least a connection for data transfer is made using the connector. The connection may be a serial data connection or a connection according to any data communication protocol, or just a simple binary signaling, wherein a specific connector corresponds to specific data. For example, a pair of connectors for data transfer may be configured to be short circuited when the vehicle is suitable for AC charging. The short circuit can also be formed by a passive circuit element, such as a resistor an inductor or a capacitor. Such a resistance or impedance can be used to detect a configuration for AC or DC Communication may take place over the same connections (or using some of the pins) as the AC and/or DC power. This can be achieved by superimposing the communications signal onto the power signal.

A single connector provides the advantage that the vehicle requires only one opening for coupling a connector in this case, and only one standard is required when a single type of connector is used. Several AC connectors are available that could be used for DC power transfer according to the present invention.

The invention further relates to an electric vehicle, comprising a battery, an on-board charger, a power input, for receiving charging power and a switch, for coupling the power input to the battery or to the on-board charger, and a controller, for controlling the switch.

In general, the controller of such a vehicle may determine whether the vehicle is charged with AC or DC power. The controller may be coupled to or even form part of on-board logic such as a vehicle management system, or a battery management system, or to sensors for determining whether an AC or DC power is present at the input, but it may also be influenced by external inputs, for example via data communication with an energy exchange station or a data processing device such as a database and/or central controlling server.

The controller may be configured to couple the power input to the on-board charger when an AC power is determined to be present at the power input, and it may further be configured to couple the power input to the battery when a DC power is determined to be present at the power input.

The invention will now be elucidated with reference to the following non limiting figures, wherein.

Figure 13A:
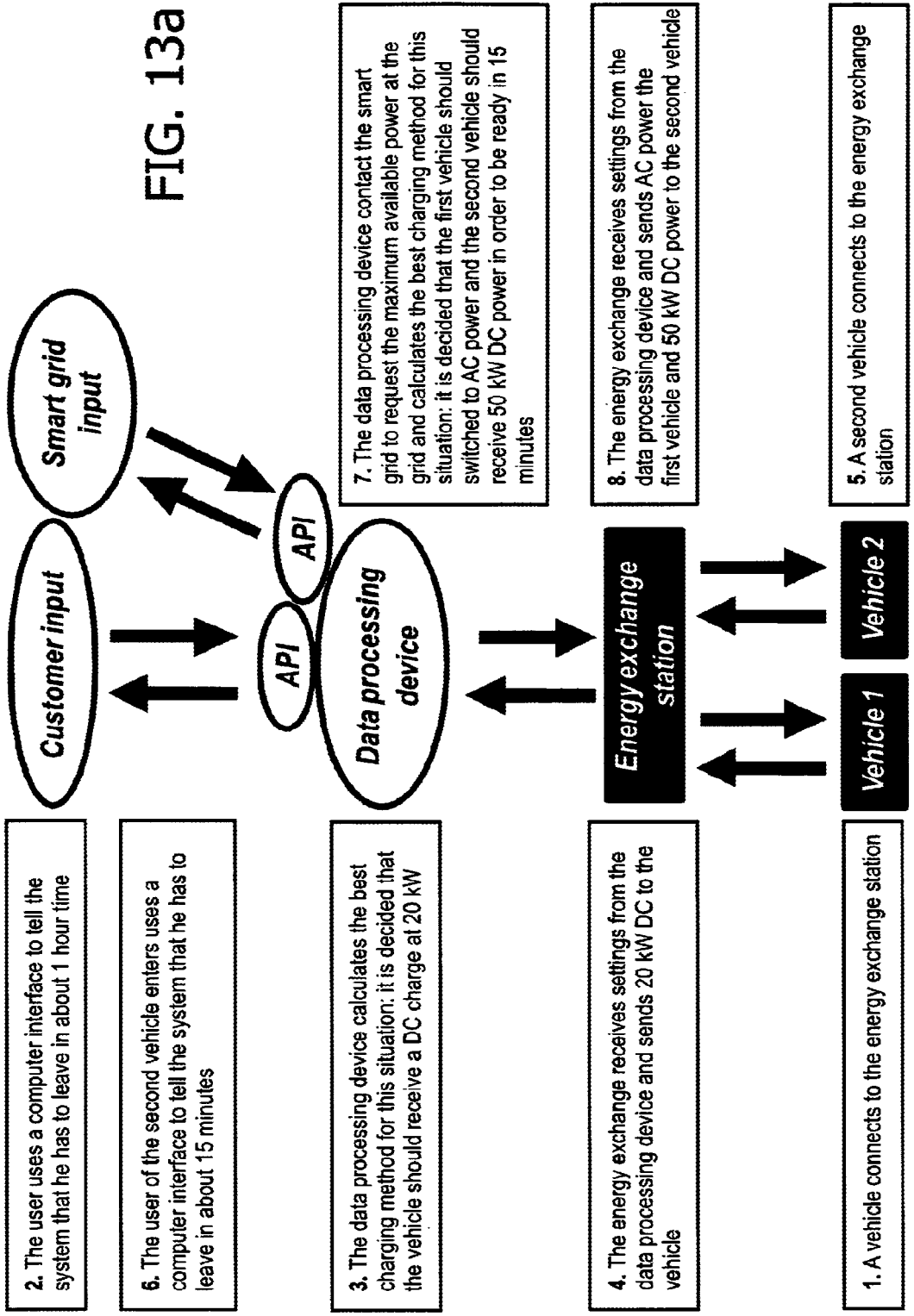
Figure 13B:
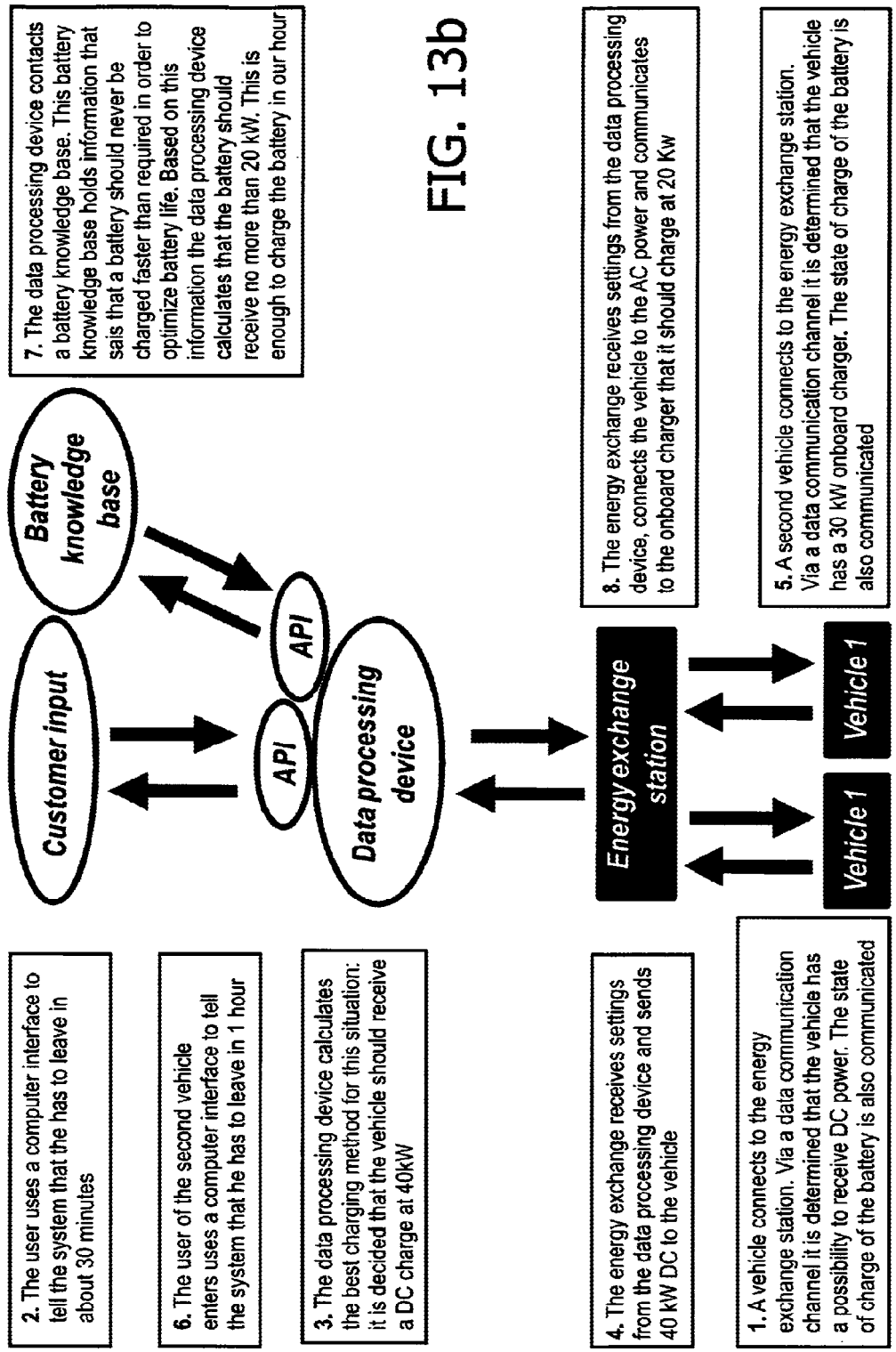
Figure 13C:
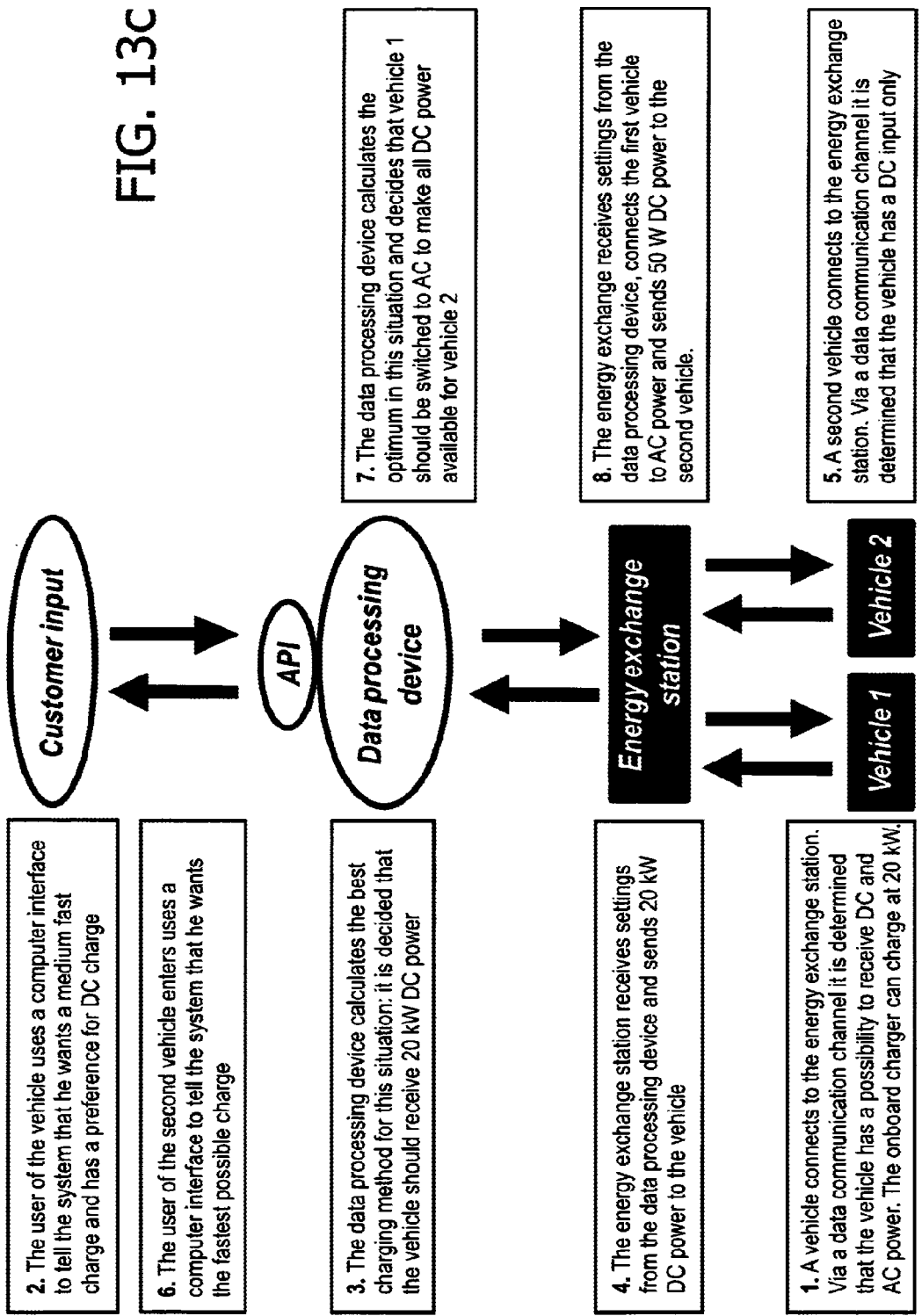
Figure 13D:
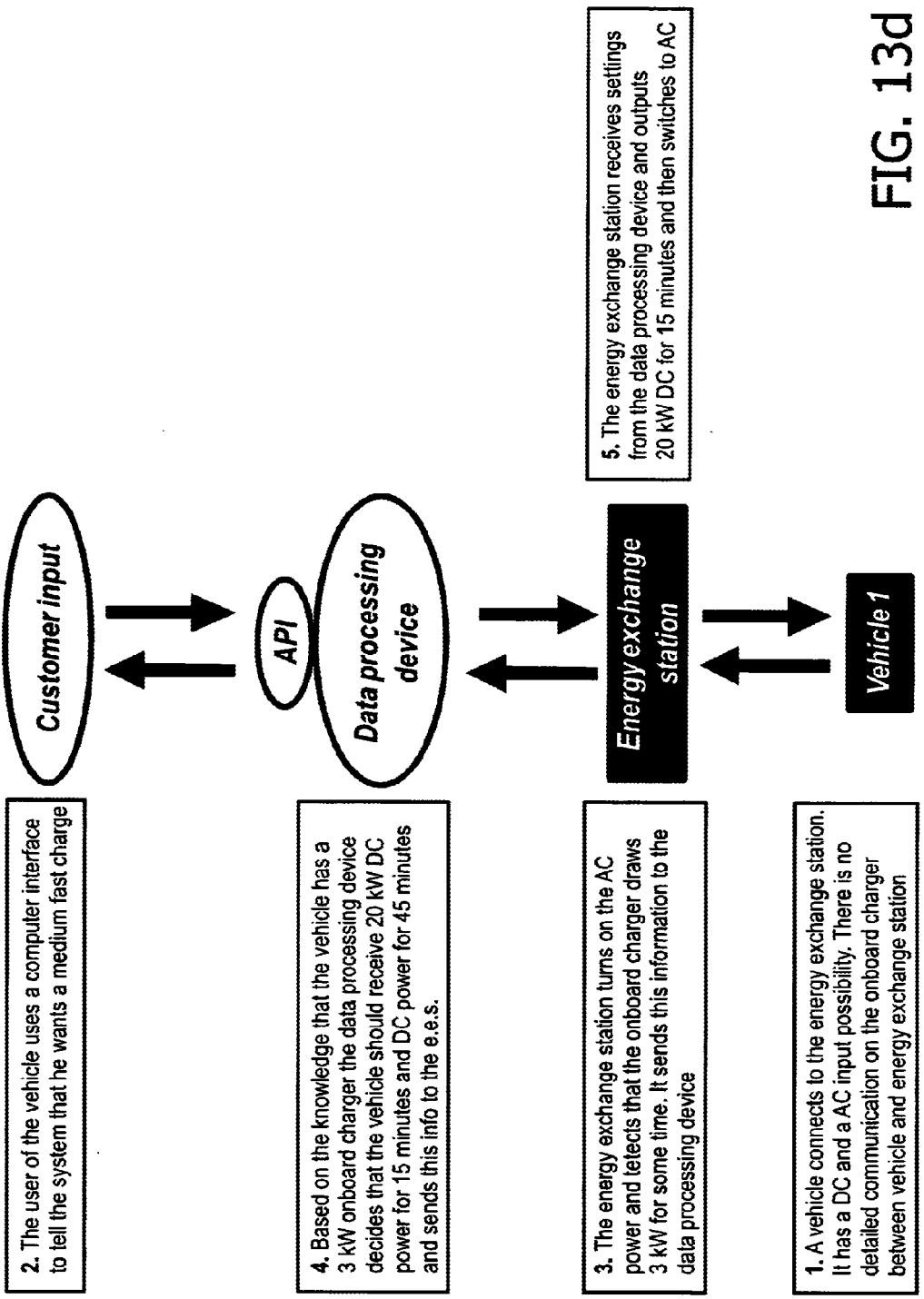
Figure 13E:
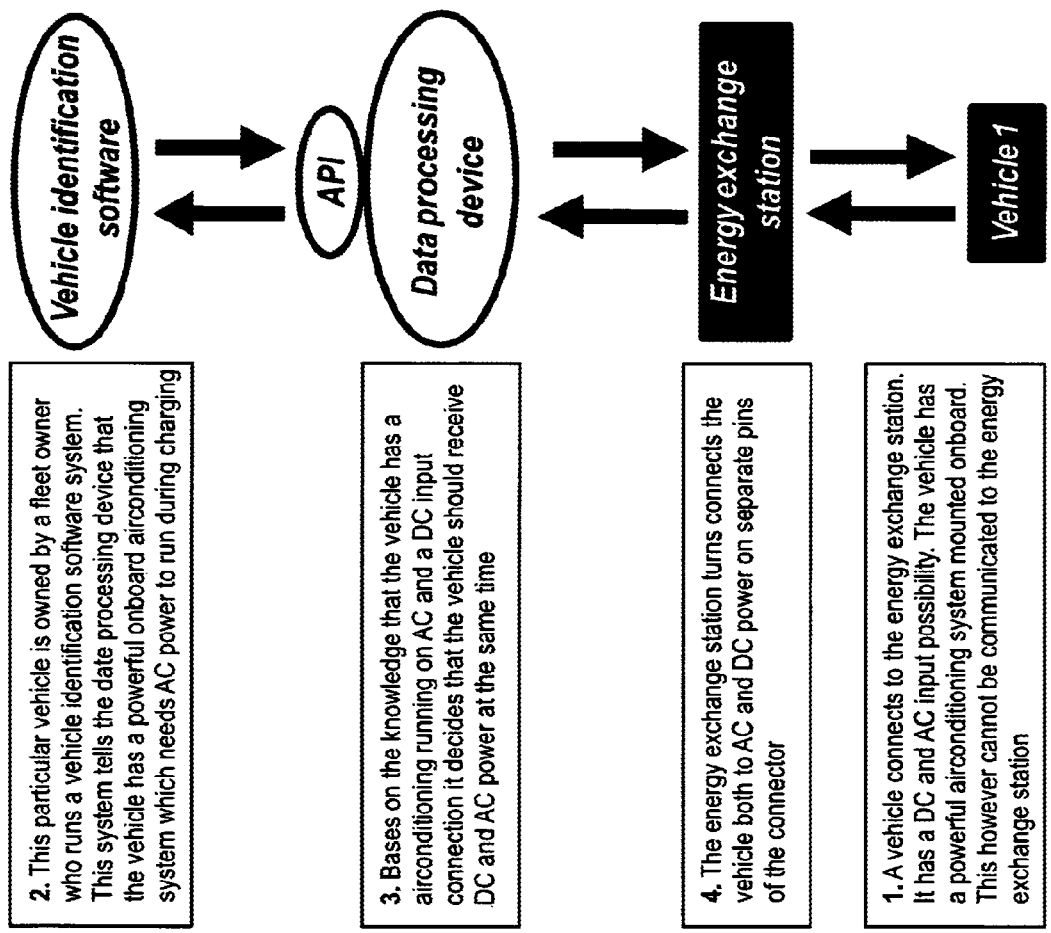
Figure 13F:
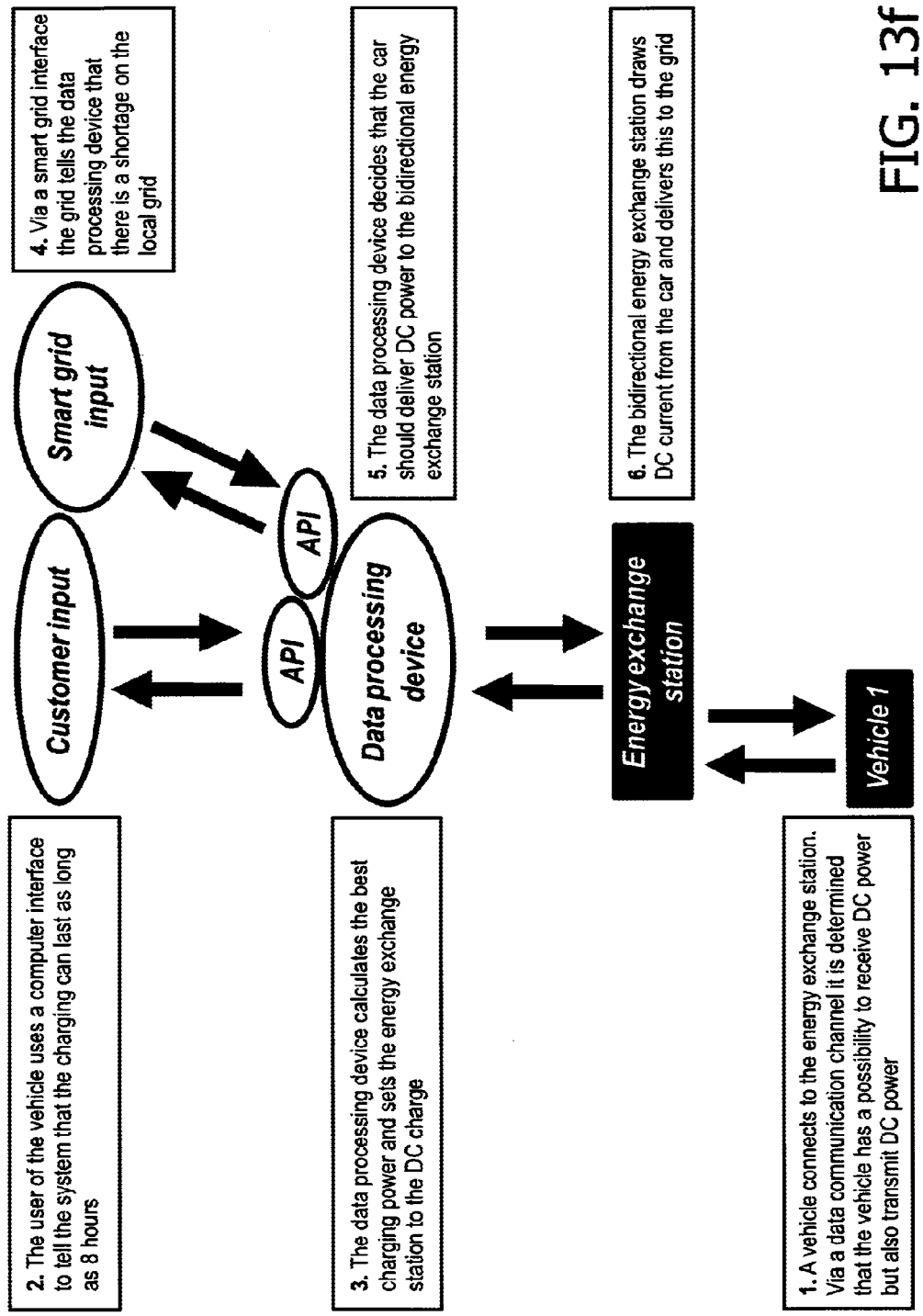
Figure 13G:
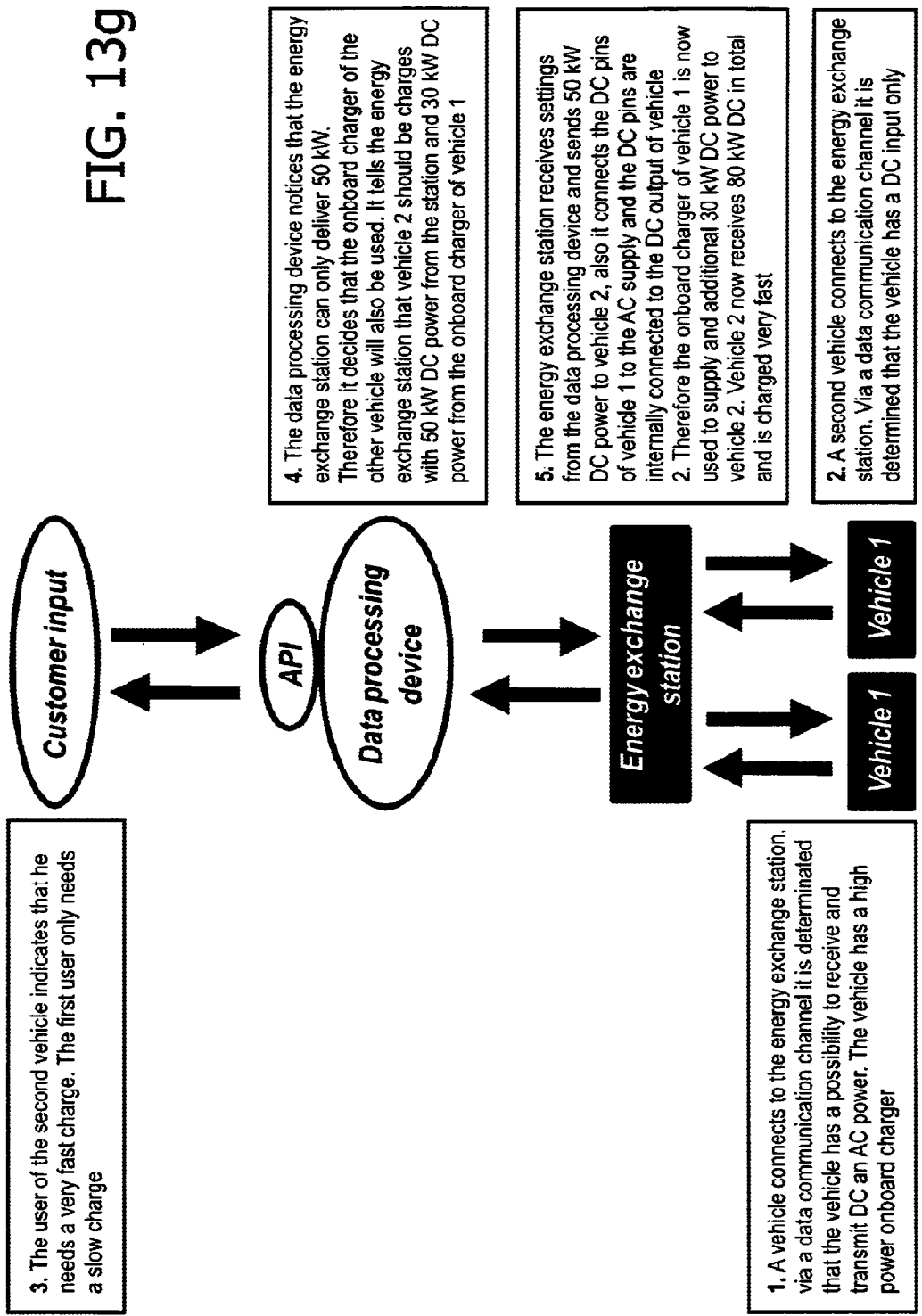
Figure 13H:
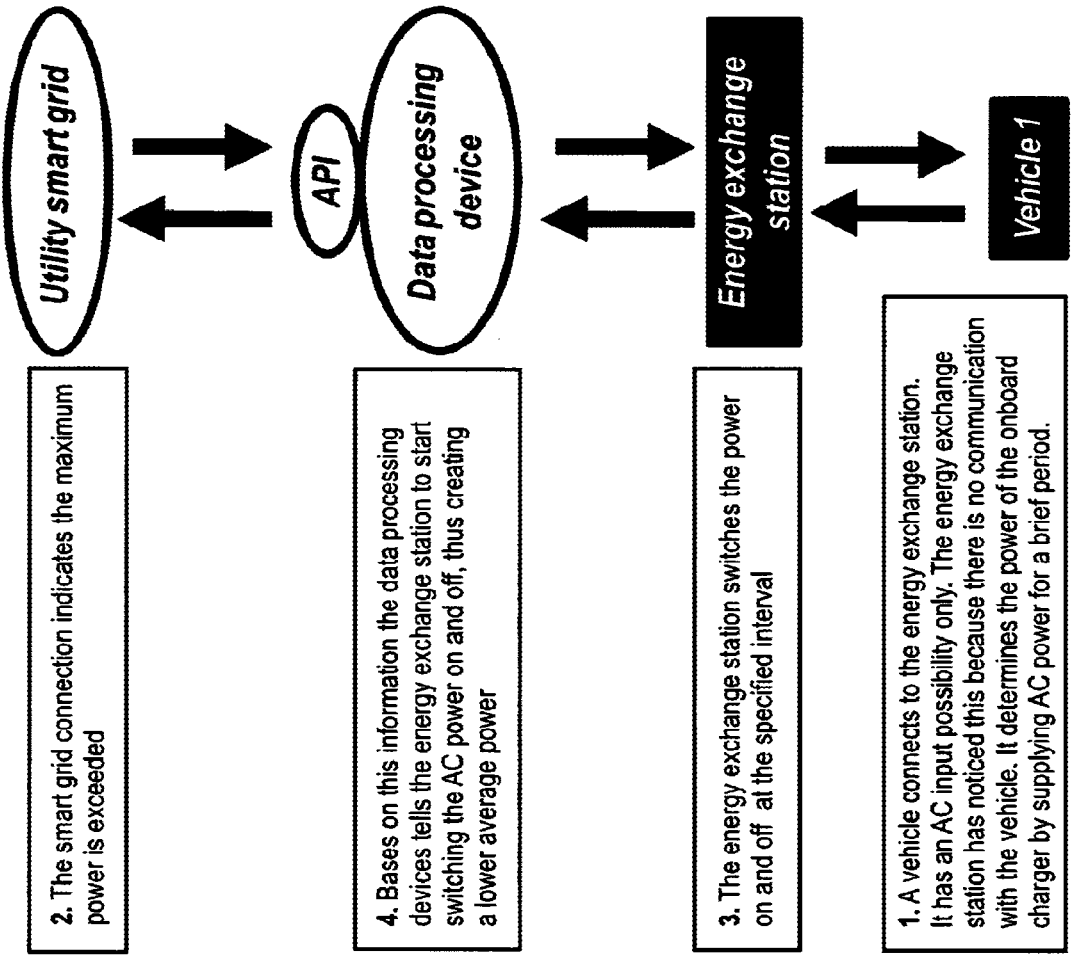
Figure 14:
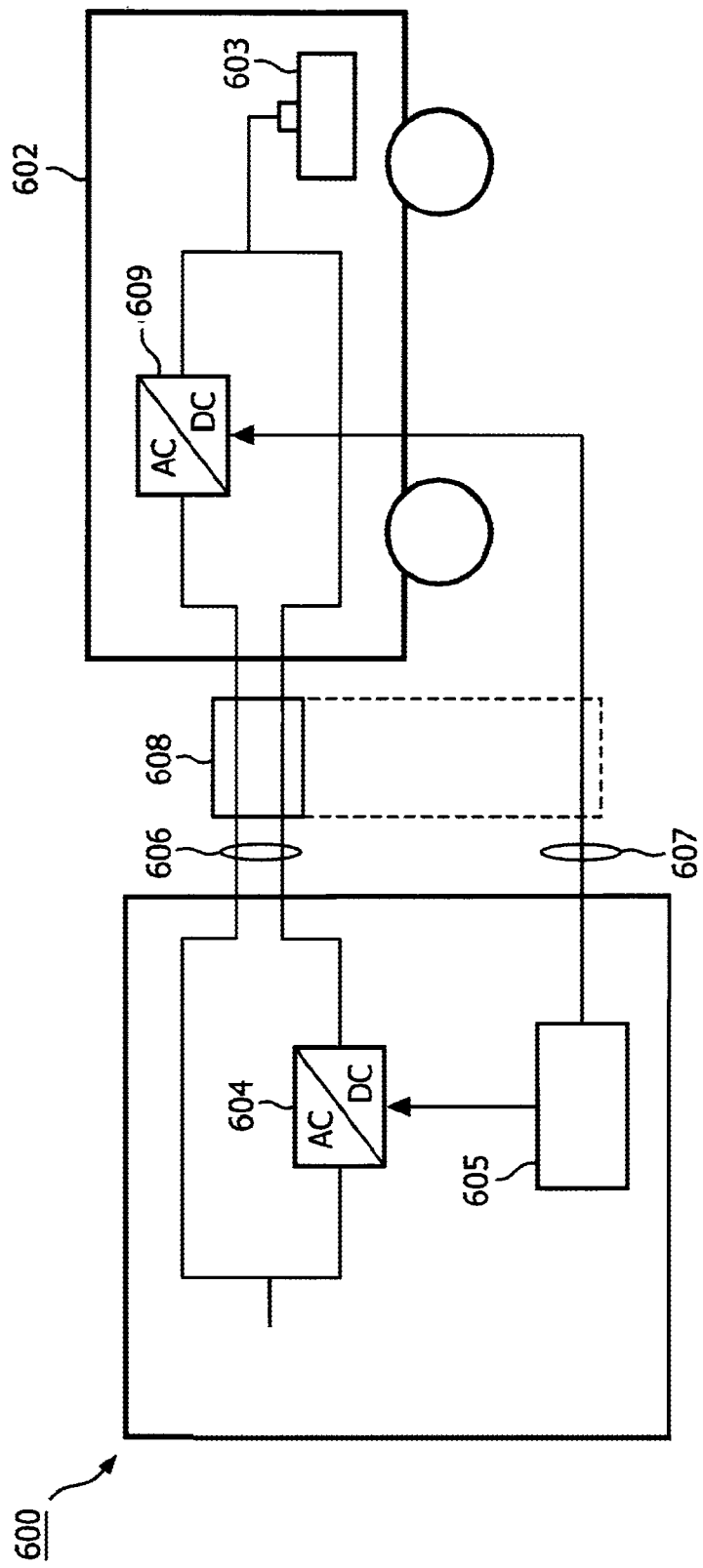

FIGS. 13a-h show various flowcharts of a method according to the present invention; and FIG. 14 shows an embodiment of an energy exchange system according to the present invention, wherein instead of a switch, a controller is used.

Figure 1:
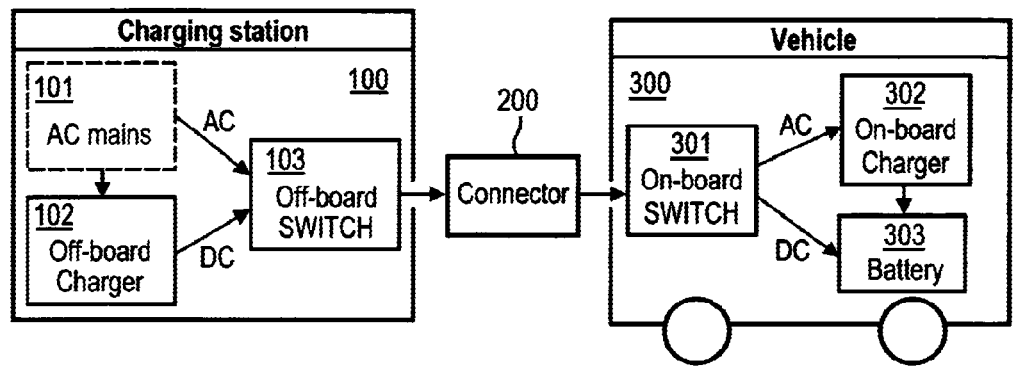
FIG. 1 shows a general overview of a system according to the present invention, to which a vehicle is coupled.

FIG. 1 shows a general overview of an energy exchange station for a battery of an electric vehicle system 100 according to the present invention, to which a vehicle 300 is coupled, comprising a power output for the vehicle 300, formed by a connector 200. The station comprises means (not explicitly shown) for determining whether the vehicle 300 is able to be charged with an AC voltage and/or a DC voltage, and an AC power input 102 and a DC power input 103. In this case, the DC power source is embodied by a power converter 102 derived def by the AC power input 101, formed by the mains. The energy exchange station further comprises a controllable switch 103, for switching the power output 200 to any of the power inputs 101, 102.

The vehicle 300 comprises a battery 303 and a charger 302, as well as a switch 301. The switch couples the power input from the connector 200 to the charger 302 when there is an AC input, and directly 303 to the battery when there is a DC input.

The switch 301 detects if DC power is available for example by communicating with the switch 103 and can reroute the connection directly to the battery 303. The switch 103 detects if a switch 301 is present (by communication) and can provide DC power if applicable.

Figure 2:
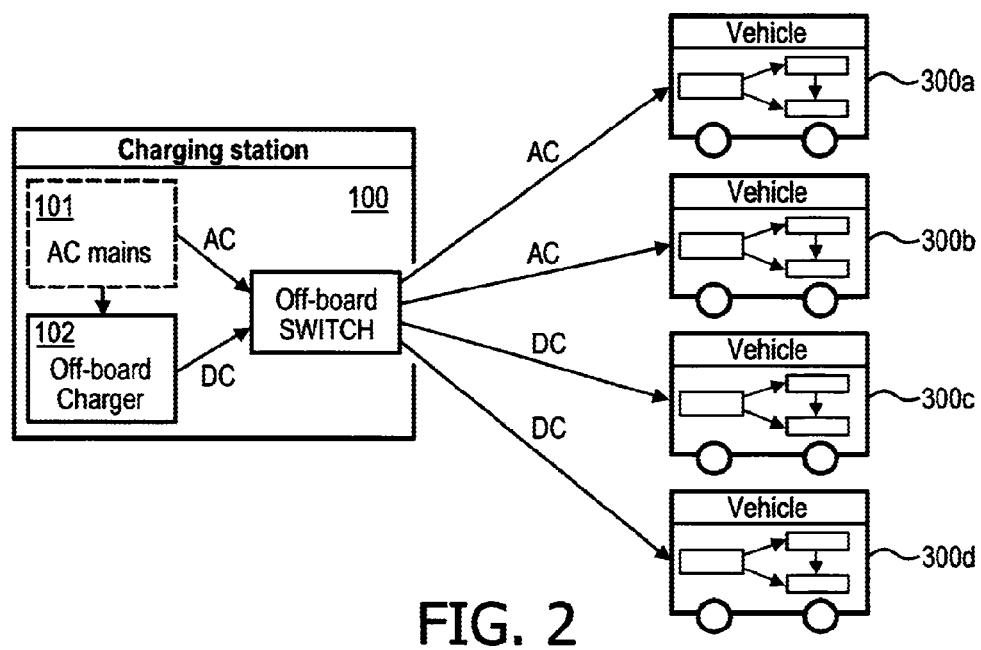
FIG. 2 shows a high level overview of the system from FIG. 1, with multiple vehicles coupled to it, being charged with either AC or DC power.

FIG. 2 shows the energy exchange station 100 from FIG. 1, wherein multiple vehicles 300a-300d are coupled to the station by means of separate connectors (not shown). Vehicle 300c is charged with DC power, vehicles 300a, 300b, 300d are charged with AC power. Such configuration may be used when there is one vehicle that requires fast charging, and multiple vehicles that have an on-board charger, or when the charging station has only one limited DC power source available.

Figure 3:
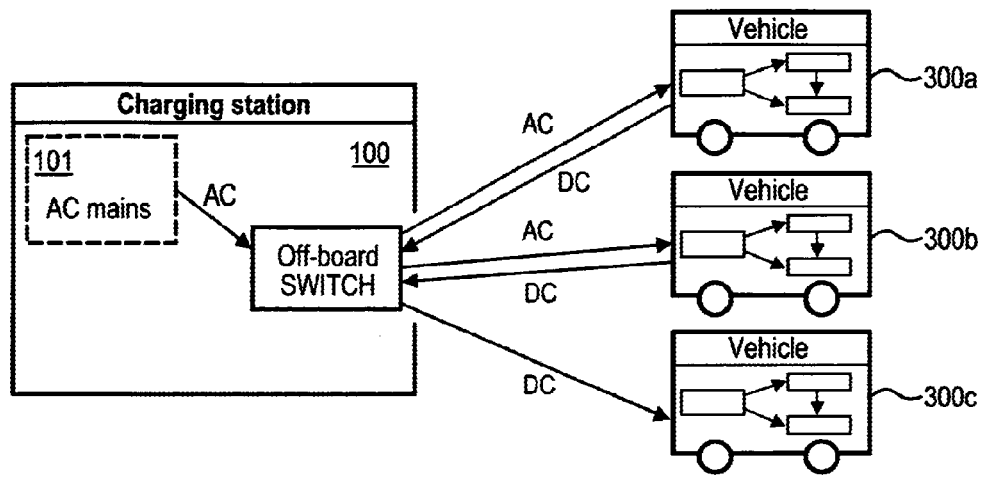
FIG. 3 shows a high level overview of the system of FIG. 1.

FIG. 3 shows another embodiment, where there's (momentarily) only an AC power source 101 available at the energy exchange station 100, that is switched to vehicles 300a and 300b. These vehicles deliver DC power, which is switched by the energy exchange station to vehicle 300c. This way, the energy exchange station can be used to transfer energy from one vehicle to another one, for example when the latter has no on-board charger.

Figure 4:
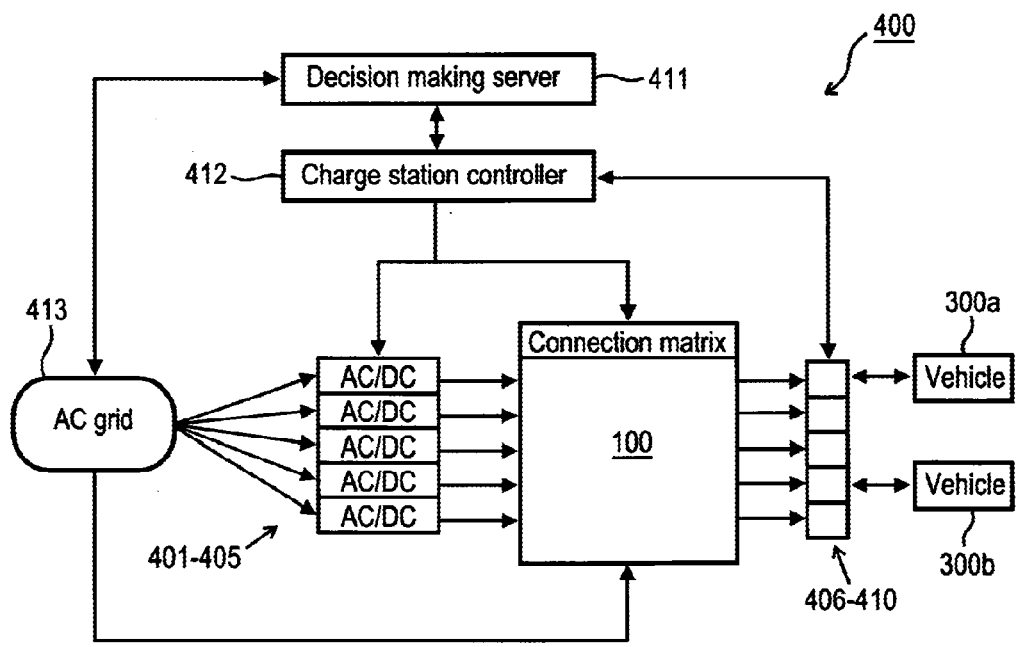
FIG. 4 shows a schematic overview of a system according to the present invention.

FIG. 4 shows an energy routing system comprising an energy exchange system 400 according to the invention. When a vehicle 300a, 300b is connected to the energy exchange station, it can communicate with the station controller through a data line. The identity of the vehicle 300a, 300b (possibly with its requirements) is then sent to the decision making server. Based on the requirements (and the requirements of the other vehicles connected) the server orders the charge station controller to have the connection matrix connect one or more AC/DC converters to the outlet of the vehicle, or order the outlet to switch to AC power. When no communication can be established the system can use AC as a default option, or use local knowledge (i.e. users that return more than once) to determine the appropriate profile.

When a vehicle is added to the system or leaves, this is updated to the decision server, which then orders a new optimal power distribution.

As shown above, the energy exchange station can have multiple outlets and has a multitude of AC/DC converters 401-405. These DC converters can, through a connection matrix, be dynamically assigned to any power output 406-410, and one power output can, through this same matrix, be connected to one or more DC converters. Additionally, each output can be connected to the AC supply chain instead of the DC connection matrix.

The energy exchange station is connected to a central decision-making server 411, which calculates the optimal division of power over the connected vehicles, based on their power requirements, possible "premium accounts" of their owners, costs of energy, grid availability, power of on-board chargers and other parameters. Based on this the central server calculates the optimal solution and orders the energy exchange station controller 412 to connect the vehicles in that way. Because of the possibility of the outlets to provide AC, some of the available DC power can be reserved for other vehicles by switching to AC for a vehicle that has an on-board charger. Upon the departure or arrival of one or more vehicles it might occur that the optimal solution changes. When this happens the entire configuration of the station can dynamically be changed mid-charge.

The energy exchange station also has local storage (DC) to be able to compensate for peak-loads (e.g. rush hour) which can be charged when no or few vehicles are connected (or when these vehicles prefer AC). This way, the following advantages can be reached.

All vehicles can be guaranteed an optimal charge time, based on their battery type, account (premium might give a faster charge), other vehicles present and grid availability.

When a vehicle has a more powerful on-board charger than available DC power left, this system can switch to AC power for that vehicle, freeing DC power for other vehicles.

When grid power is sparse in the region of the charger, charge power can be lowered.

A vehicle that can only be charged through its on-board charger can also connect to this system.

Because the data is available, a time-to-go indication can be given to the owner of the vehicle.

Figure 5:
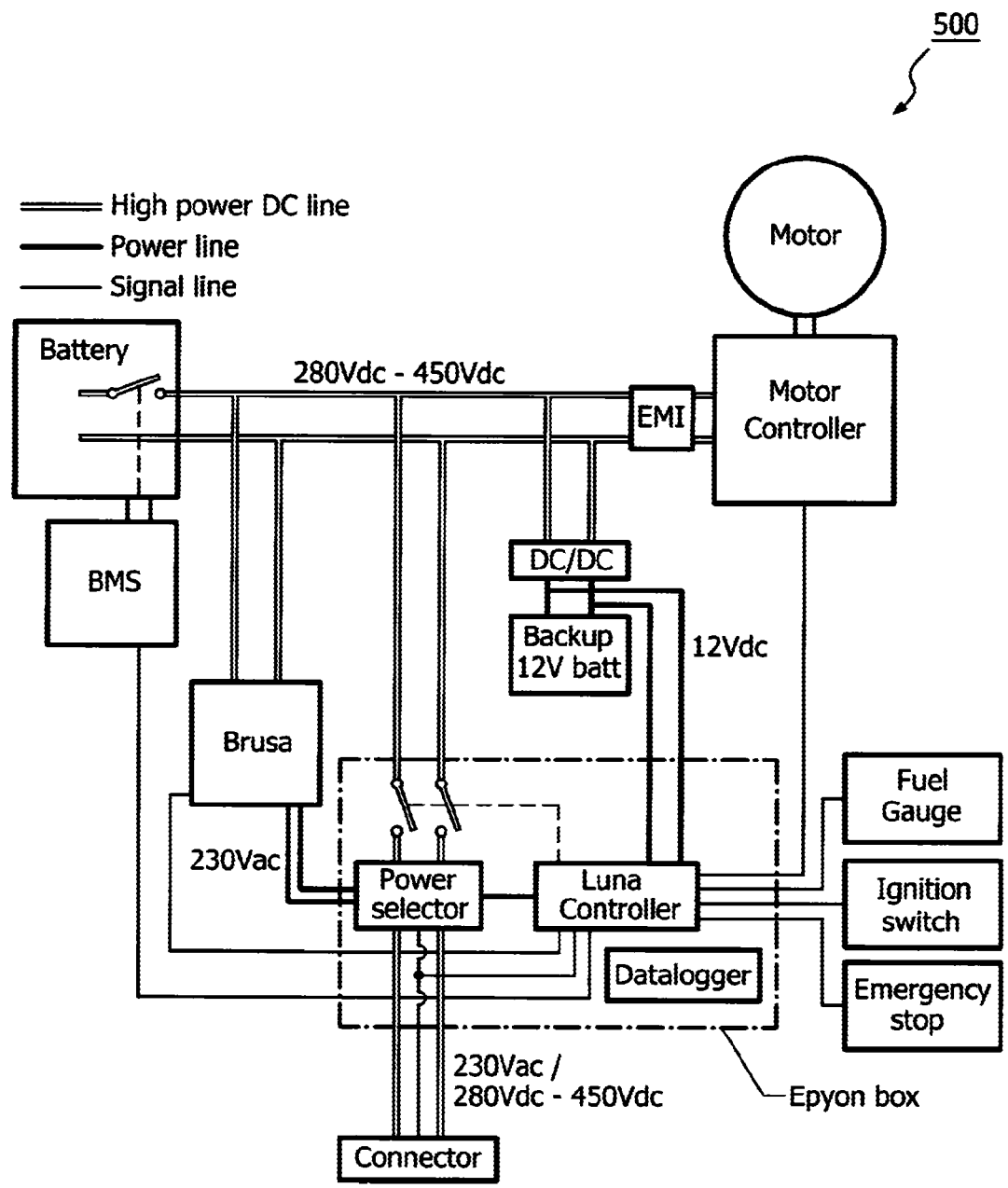
FIG. 5 shows a detailed view on the present invention in a vehicle.

When an AC charging infrastructure is already present, it can easily be upgraded to supply both AC and DC, as the outlets only need to switch between AC and DC power When the (high current) CC charging phase of a battery is replaced by a (lower current) CV charge phase, the power can be switched from the high power DC supplies to the (lower power) on-board charger, freeing up DC power to be used by other connected vehicles FIG. 5 shows an embodiment 500 of the electrical system inside a vehicle. The connector can carry either DC or AC power. In this case a single phase solution is presented, but it can be easily read as a system that uses a two, three or more phase connection. In this example, the power selector can switch power to either an on-board charger, in the case of AC power or even by default, or directly to the battery. In some cases the on-board charger can be connected to the connector at all times, because it can withstand DC on its input or it can even operate under that condition.

Figure 6:
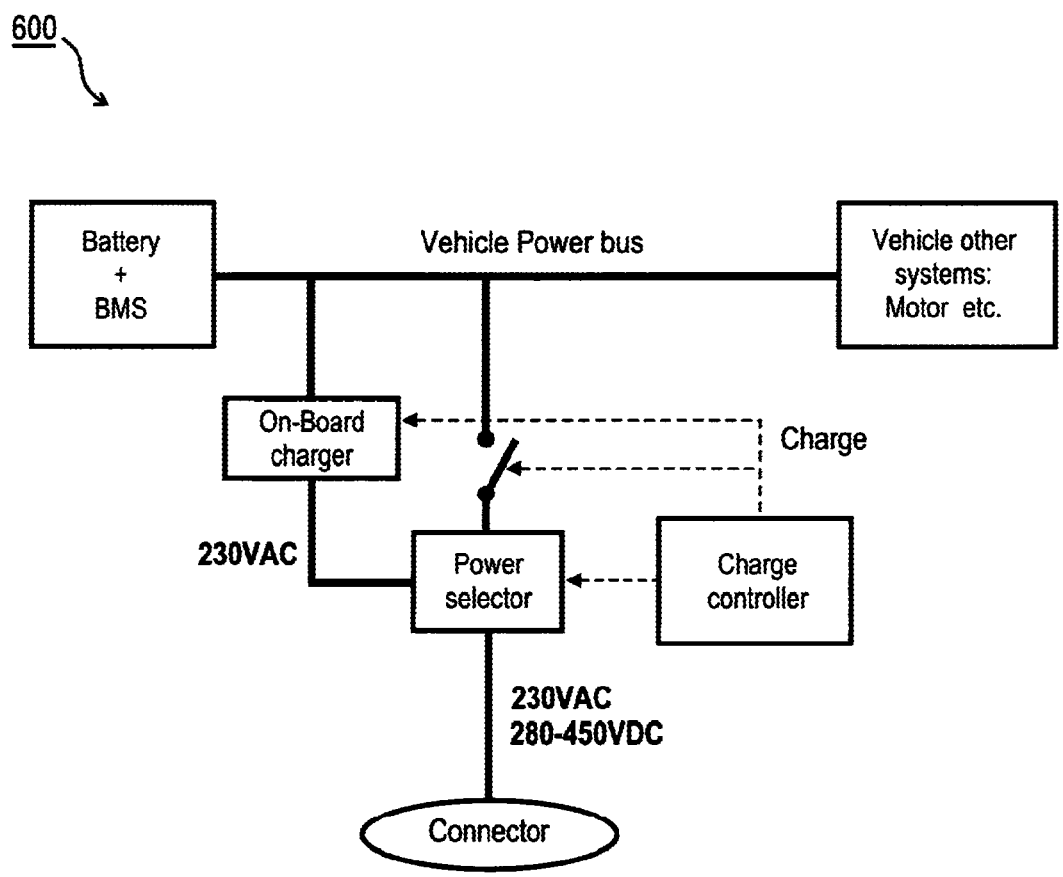
FIG. 6 shows a schematic overview 600 how a connector gets energy from the charger.

FIG. 6 shows a schematic overview 600 how a connector receives energy from the charger. The power may be AC, multiphase AC or DC. The charge controller knows (via a vehicle communication system or some other information source, such as a detection system) whether AC or DC power is on the line. When AC current is supplied, the power bus of the system is disconnected from the power selector (and thus from the charger) and the On-Board charger is switched on by the charge controller. If DC power is supplied to the connector, the on-board charger is switched off and the DC power is routed straight to the vehicles power bus. In some cases the on-board charger can be connected to the connector at all times, because it can handle DC power on its input or even in some situations operate with DC on its input.

Figure 7:
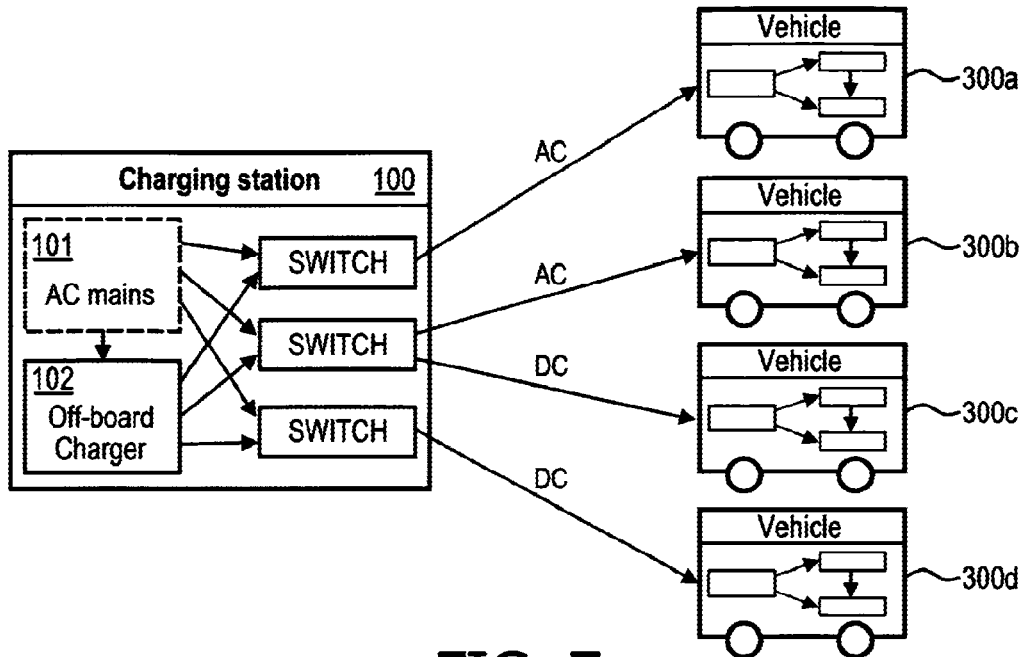
FIG. 7 shows an embodiment with multiple switches.

FIG. 7 shows an embodiment with multiple switches wherein some switches are configured for charging a single vehicle, and some switches are configured to charge multiple vehicles at a time.

Figure 8:
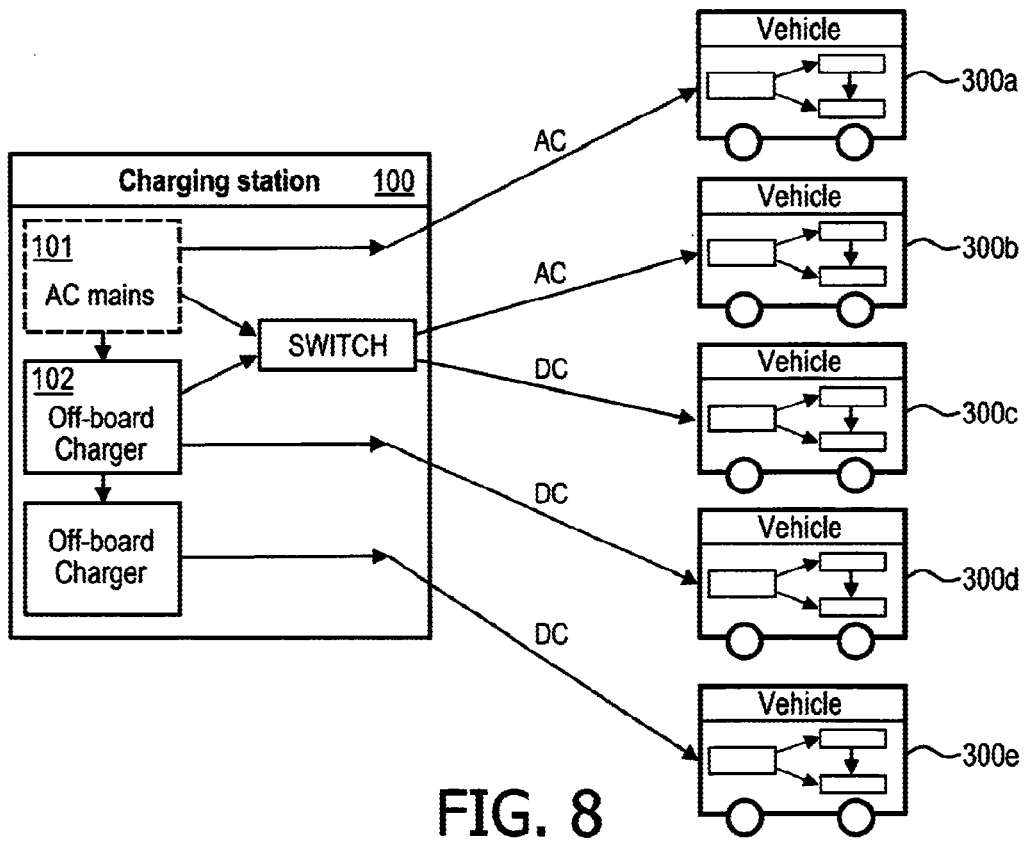
FIG. 8 shows an embodiment wherein the energy exchange station has power outputs that are not directed via the switch

FIG. 8 shows an embodiment wherein the energy exchange station has power outputs that are not directed via the switch. Thereto, shared or dedicated off-board chargers may be present.

Figure 9:
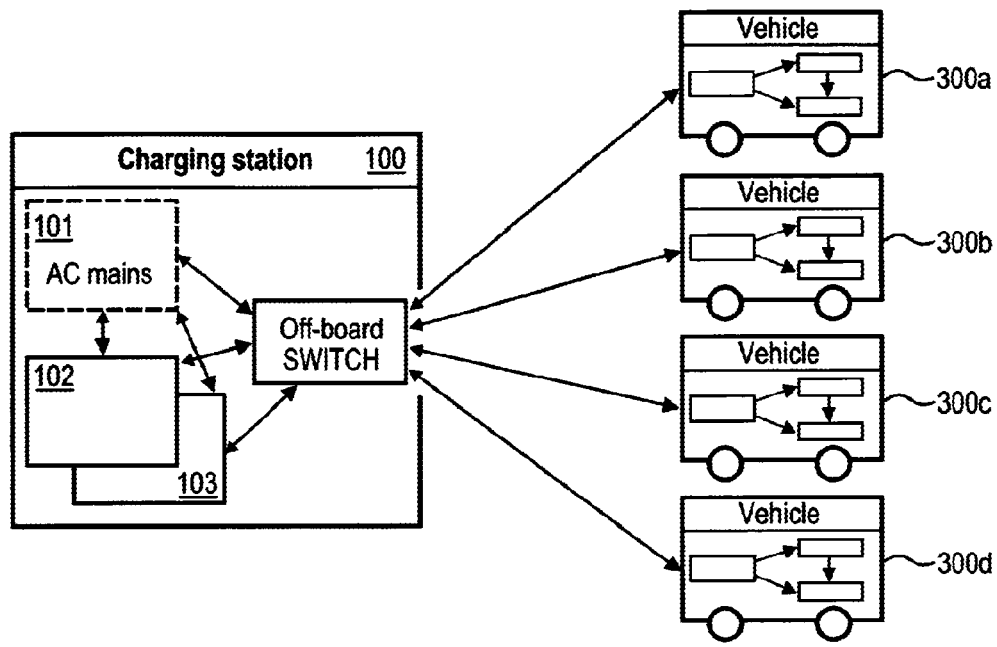
FIG. 9 shows an embodiment showing that the energy station can also be used to deliver power from the vehicles' batteries to the grid.

FIG. 9 shows an embodiment showing that the energy station can also be used to deliver power from the vehicles' batteries to the grid. This can happen by converting battery DC power in the on board charger to the grid or by transferring DC battery power from the at least one vehicle to the at least one off-board charger (102) or one or more DC/AC converters (103), to deliver the power to the AC mains.

Figure 10:
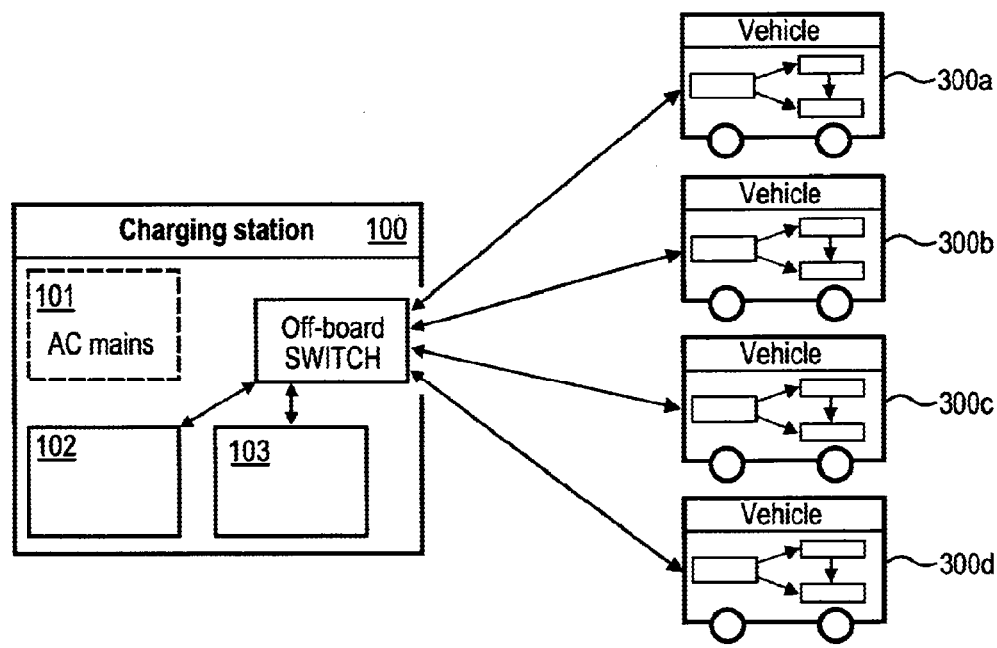
FIG. 10 shows an embodiment wherein a converter is used to charge one or more vehicles from the DC battery power of other one or more vehicles.

FIG. 10 shows an embodiment wherein a (multiple-input) DC/DC converter (102 and/or 103) is used to charge one or more vehicles from the DC battery power of other one or more vehicles. In this case the AC mains and/or the power converter (102) are not required to be used. Because the vehicles and the charging station comprise AC/DC, DC/AC and DC/DC converters, in this configuration the vehicles that deliver power can be AC or DC (or a mix) and the vehicles that receive power can get AC or DC.

Figure 11:
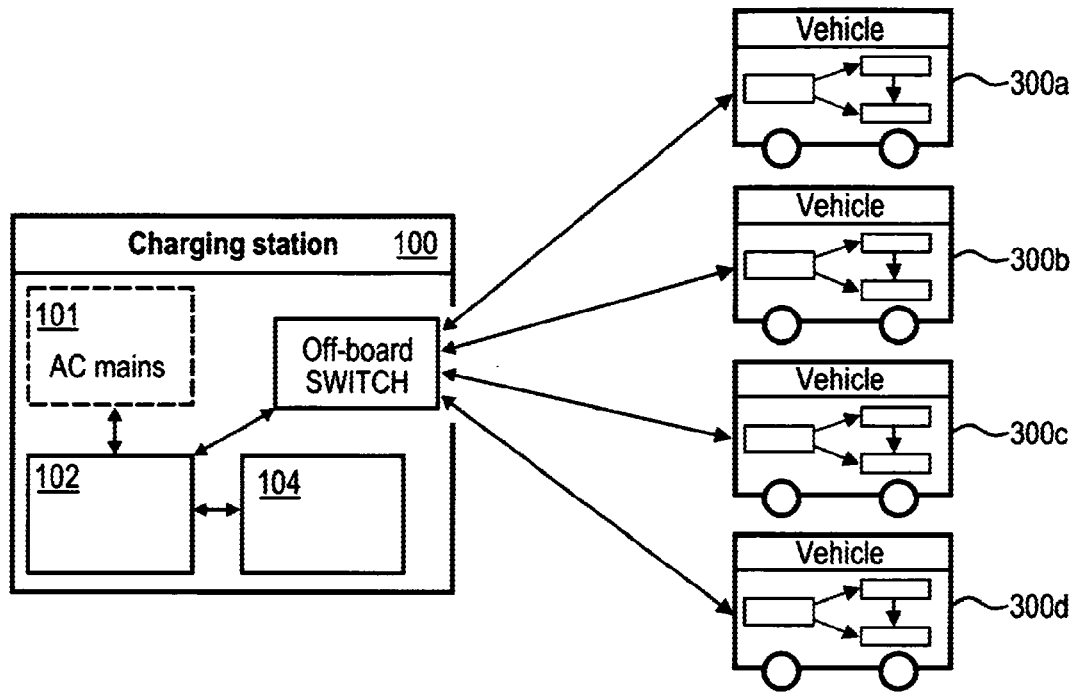
FIG. 11 shows an embodiment wherein a DC power source delivers DC power to a DC/AC converter.

FIG. 11 shows an embodiment wherein a DC power source (e.g. local storage or PV panel) (104) delivers DC power to a DC/AC converter (102) which converts it to AC to supply the mains or supply one of the on-board chargers.

Figure 12:
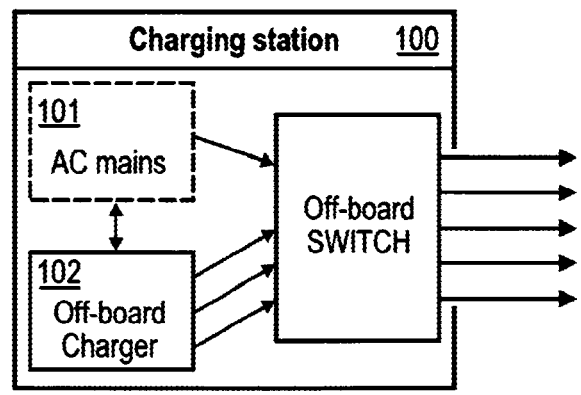
FIG. 12 shows a charging station having more outputs than it can serve with DC-power.

FIG. 12 shows that the charging station can have more outputs than it can serve with DC-power. This is an embodiment where the number of vehicle connections exceeds the number of DC power inputs. For example the Off-board charger may have 3 DC power outputs. The station can have 5 charge connections.

FIG. 13a shows an a flowchart wherein the system decides based on input from the customer (requested time before leaving) and input from the electricity grid (maximum available power) what the best charging strategy is. In this example the maximum DC power which the system can provide is 50 kW. Furthermore the system is equipped with a data processing device to make decisions and data input devices, in this case a user terminal and a connection to a smart-grid computer.

FIG. 13b shows a system which is equipped with means to control the onboard charger of vehicles through a data connection (wired or wireless) with the vehicle. In this example the maximum DC charging power of the energy exchange system is limited to 50 kW. Two vehicles arrive at the station. One has a 50 kW DC charging capability. The other vehicle has a 30 kW onboard charger and a DC charging capability.

FIG. 13c shows an energy exchange station equipped with two charge connections with a 50 kW DC power output possibility and the possibility to deliver 40 kW AC per output. The 50 kW DC power is made through the use of a 50 kW AC/DC converter. The whole system is connected to a grid connection which can deliver a maximum of 100 kW.

FIG. 13d shows a case wherein the energy exchange station cannot detect what available onboard charging power is, it can send AC to the vehicle and measure the power which the vehicle draws. After measuring this power for some time the data processing device can determine the power of the onboard charger.

FIG. 13e shows a case wherein a vehicle can have an onboard system (such as an air conditioning) which can be powered by AC during charging.

FIG. 13f shows an energy exchange station transferring DC power from the battery to the grid.

FIG. 13g shows how an energy exchange station uses the onboard charger to charge a second vehicle connected to a second outlet.

FIG. 13h shows how the power load to the grid is controlled by switching the on-board charger on and off if it is not possible to control the charging power of the on-board charger.

FIG. 14 shows an energy exchange station 100 for a battery 303 of at least one electric vehicle 300, comprising at least one power output 106 for a vehicle, at least one data communication port 107 for communication with the electric vehicle 300 for determining whether the vehicle 300 is able to be charger with an AC voltage and/or a DC voltage. In this case, the DC power source is embodied by a power converter 102 derived by the AC power input 101, formed by the mains. The energy exchange station further comprises a controller 105 for controlling the power supplied from the AC power supply and/or DC power supply to the at least one power output 106. The controller 105 is coupled to the data communication port 107 for communication with the electric vehicle. In a specific embodiment the controller 105 may interact with a controller 304 in the electric vehicle for determining whether the vehicle could be charged with AC and/or DC. In this case the controller 304 in the electric vehicle will also be coupled to the onboard power converter 302 for controlling the DC power delivered to the battery 303.

The energy exchange station may be equipped with one single connector 200 for AC and DC power, which may further comprise one or more communication lines for the data communication port 107.

The invention claimed is:

1. Energy exchange station for a battery of at least one electric vehicle, the energy exchange station comprising:
    at least one power output for a vehicle;
    at least one data communication port for communication with an electric vehicle and that determines which among an AC voltage, a DC voltage, or an AC voltage and a DC voltage, a vehicle is able to be charged with;
    a plurality of power supplies, comprising
        at least one AC power supply; and
        at least one DC power supply;
    a controller, for controlling power supplied from the AC power supply and/or DC power supply to the at least one power output, wherein
    at least one controllable switch is provided for coupling the at least one power output to any of the plurality of power supplies;
    wherein the controller controls the switch at least based on the determination via the data communication port and the energy exchange station is external to the at least one electric vehicle, and
    wherein the controller is coupled to the at least one data communication port for communication with the electric vehicle.

2. An energy exchange station according to claim 1, wherein the at least one data communication port is used to control an onboard charger of vehicles during operation.

3. An energy exchange station according to claim 1, wherein the at least one data communication port is configured for communication with a communication system in a vehicle during operation.

4. An energy exchange station according to claim 1, wherein the at least one data communication port is configured for communication by:
    binary signaling, serial data communication, power line communication, PWM signaling, wireless communication, CAN-bus communication, communication over ethernet or communication according to a data communication protocol.

5. An energy exchange station according to claim 1, wherein:
    the at least one data communication port for determining is configured for detecting a presence of an on-board battery charger of a vehicle; and
    wherein the controller is configured to switch the output to an AC power supply when an on-board battery charger is detected; and wherein
    the controller is configured to switch the output to a DC power supply when a direct connection to the battery is determined.

6. An energy exchange station according to claim 1, wherein the controller is configured to switch to the AC power supply after an interval of being switched to the DC power supply, to firstly charge a battery fast on DC power, and to secondly continue charging the battery slower on AC power.

7. An energy exchange station according to claim 1, configured to output AC power and DC power simultaneously.

8. An energy exchange station according to claim 7, wherein the AC and DC power are delivered to a same output, for charging a battery of a vehicle directly with DC power, and via an on-board battery charger with AC power indirectly.

9. An energy exchange station according to claim 1, wherein the DC power supply comprises:
    a power converter, for delivering a switched DC power.

10. An energy exchange station according to claim 1, wherein controlling of the at least one controllable switch is based on external parameters, such as power available at at least one of the power inputs, and/or power required from electric vehicles at further power outputs.

11. An energy exchange station according to claim 1, wherein controlling the at least one controllable switch is performed based on input by a data processing device, such as an external decision making facility.

12. An energy exchange station according to claim 1, configured to control a charging power of an on-board charger via a data communication connection with a vehicle.

13. An energy exchange station according to claim 1, comprising:
    a connector for connecting a vehicle to the output, the connector being configured for both AC and DC power transfer.

14. An energy exchange station according to claim 1, wherein data communication is performed over at least some pins of a connector used for exchanging AC and/or DC power, by superimposing a communications signal onto a power exchange.

15. An energy exchange station according to claim 1, comprising a power connector, configured for:
    exchanging multi-phase AC power via multiple power contacts of the power connector when a vehicle is charged with AC power; and
    exchanging DC power via at least two contacts of said power connector when charging a vehicle with DC power.

16. An energy exchange station according to claim 15, wherein exchanging DC power takes place via two sets of contacts, each set comprising:
    at least one contact used for AC power exchange.

17. An energy exchange station according to claim 15, wherein data communication is performed over at least some pins used for exchanging AC and/or DC power.

18. An energy exchange station according to claim 15, wherein the power connector comprises:
    at least a connection for data transfer.

19. An energy exchange station according to claim 15, wherein the power connector comprises:
    a pair of connectors for data transfer, configured to be shortcut when a vehicle is configured for AC charging.

20. An electric vehicle, configured for being charged via the energy exchange station according to claim 1, the vehicle comprising:
    a battery;
    an on-board charger;
    a power input, for receiving charging power;
    a switch, for coupling the power input directly to the battery or via the on-board charger to the battery;
    a controller, for controlling the switch; and
    data communication means, for communicating suitable charging protocols for the vehicle to the exchange station.

21. A vehicle according to claim 20, wherein a determination of presence of AC or DC is enabled via the data communication means of the vehicle and the energy exchange station, and wherein the controller is configured to couple the power input to the charger when an AC power is determined to be present at the power supply, and to the battery when a DC power is determined to be present at the power input.

22. Method for charging a battery of an electric vehicle, comprising:
   determining which among an AC voltage, a DC voltage, or an AC voltage and a DC voltage, a vehicle coupled to a power output is able to be charged with;
   switching the power output to either an AC power input or a DC power input based on the determination;
   switchinq the power output to the AC power input when a presence of an on-board charger is determined; and
   switchinq the power output to the DC power input when no on-board charqer is determined to be present.

23. Method according to claim 22, wherein the determining comprises:
   switching the power output to the DC power input when a direct connection to the battery is available; and
   switching the power output to the AC power input when no direct connection to the battery can be made, and an on-board charger is determined to be present.

24. Method according to claim 22, wherein controlling a switch is performed based on input by a data processing device.

* * * * *